UNITED STATES PATENT OFFICE.

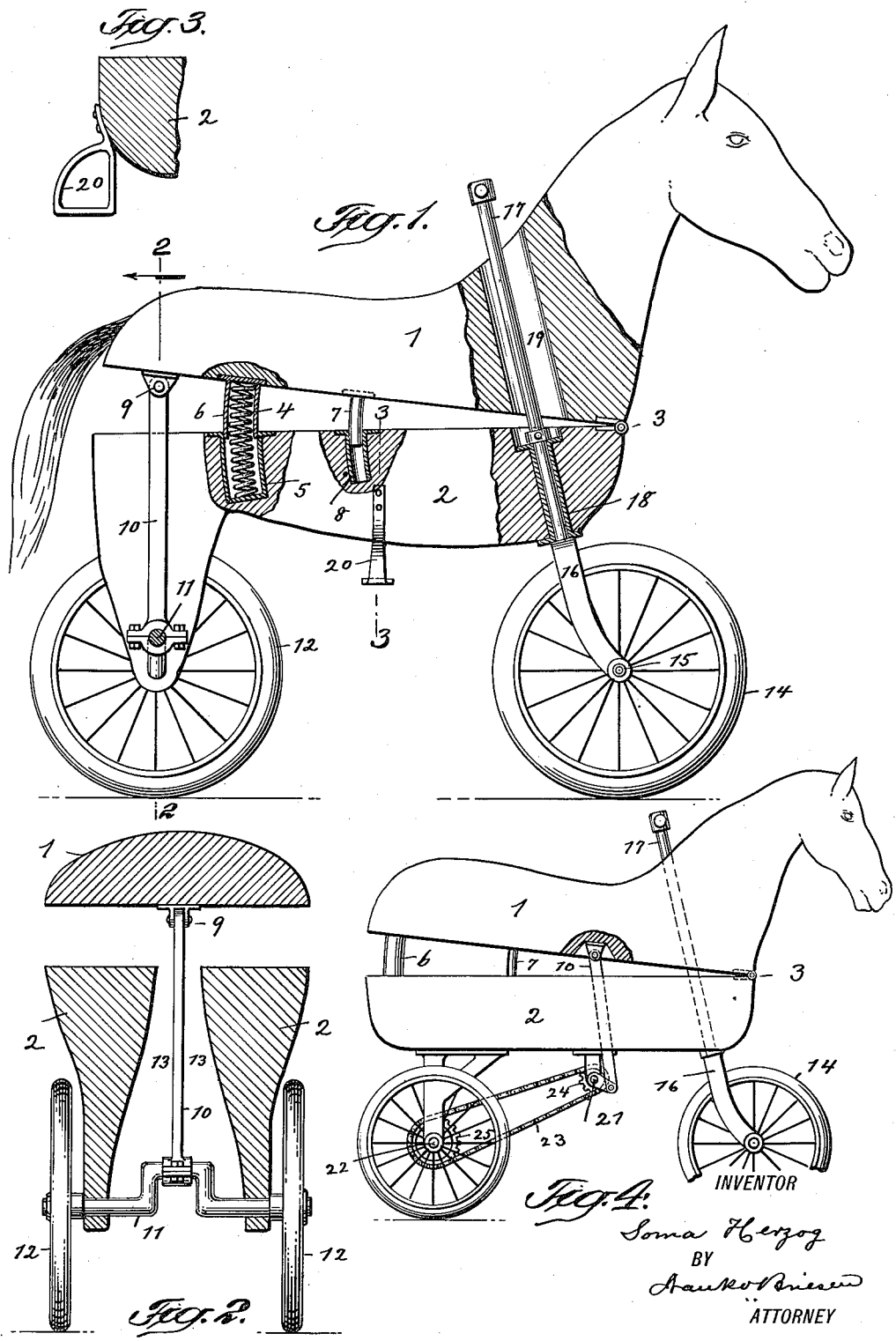

SOMA HERZOG, OF NEW YORK, N. Y.

HOBBY-HORSE.

1,252,693.  Specification of Letters Patent.  Patented Jan. 8, 1918.

Application filed September 17, 1917. Serial No. 191,741.

*To all whom it may concern:*

Be it known that I, SOMA HERZOG, a citizen of the United States, and a resident of New York city, county and State of New York, have invented certain new and useful Improvements in Hobby-Horses, of which the following is a specification.

This invention relates to a hobby horse of novel construction, to which forward motion may be imparted, by an up and down or bobbing movement of the rider. The invention consists in the various features of novelty more fully pointed out in the specification and appended claims.

In the accompanying drawing:

Figure 1 is a side elevation partly in section of a hobby horse embodying my invention;

Fig. 2, a cross section on line 2—2 Fig. 1;
Fig. 3, a section on line 3—3 Fig. 1, and Fig. 4, a side view, partly in section, of a modification.

The trunk or body of the horse is divided into an upper section or member 1, and a lower section or member 2, said members diverging from front to rear, and being connected to each other at their front ends by a hinge 3. Members 1 and 2 are normally sustained in their spaced position by means of a coiled spring 4, shown to depend from upper member 1, and to enter a bushed socket 5 of lower member 2, the spring being housed within a tubular casing 6. A pin 7 depending from upper member 1, and engaging a second bushed socket 8 of lower member 2, serves to steady the play of the upper member on hinge 3; casing 6, pin 7, and sockets 5 and 8 being arched with said hinge as a center.

To upper member 1, there is pivoted at 9, in proximity to the rear end thereof, the upper end of a pitman or driving rod 10, the lower end of which engages a cranked rear axle 11 journaled in lower member 2, and carrying the propelling wheels 12. In order to accommodate pitman 10, lower member 2 is split longitudinally (Fig. 2) to form a clearance 13 within which the pitman is centered. The steering wheels 14 are mounted on front axle 15, journaled in a forked bearing 16, from which extends upwardly the steering post 17. This post passes through a bushed bore 18 of lower member 2, and through a widened bore 19 of upper member 1, said widened bore permitting a rocking movement of said upper member on hinge 3.

To the lower member are likewise secured, a pair of stirrups 20, by means of which the rider may alternately raise himself off and lower himself upon upper member 1.

It will be seen that by this raising and lowering of the rider, his weight will be alternately taken off and placed upon the upper member 1, and that by this action, spring 4 will be alternately expanded and compressed, so as to assist in imparting an oscillating movement to upper member 1 on fulcrum 3. This oscillating movement will by pitman 10, impart a rotary movement to the rear driving axle 11, so as to propel the device forward.

With the embodiment illustrated in Fig. 4, pitman 10, drives a crank shank 21 journaled in lower member 2, and transmitting movement to the rear axle 22 by means of a chain 23 and sprocket wheels 24 and 25. With both embodiments of the invention, the rider may propel his steed by a bobbing movement, incident to riding, which is not apt to tire him out, while furthermore, the speed imparted to the horse may be accelerated, retarded or entirely checked in the most simple and natural manner.

I claim:

1. A hobby horse comprising an upper member, a lower member diverging from the upper member, a hinge connecting said members, a driving rod depending from the upper member, and a driving axle journaled in the lower member and operatively connected to said rod.

2. A hobby horse comprising an upper member, a diverging lower member, a hinge connecting said members at one of their ends, a spring interposed between the members, a driving rod depending from the upper member, a driving axle journaled in the lower member and operatively connected to said rod, and stirrups mounted on the lower member.

3. A hobby horse comprising an upper member having an enlarged bore, a diverging lower member, a hinge connecting said members at one of their ends, a spring interposed between the members, a driving rod depending from the upper member and passing through the lower member, a driving axle journaled in said lower member and operatively connected to said rod; a front axle bearing, and a steering post connected to said bearing, said steering post passing through the lower member and through said enlarged bore of the upper member.

SOMA HERZOG.